US011501176B2

(12) United States Patent
Mitra et al.

(10) Patent No.: US 11,501,176 B2
(45) Date of Patent: Nov. 15, 2022

(54) VIDEO PROCESSING FOR TROUBLESHOOTING ASSISTANCE

(71) Applicant: International Business Machines Corporation, Armonk, NY (US)

(72) Inventors: Abhishek Mitra, Bengaluru (IN); Nitin Gupta, Delhi (IN); Shashank Mujumdar, Delhi (IN); Sameep Mehta, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 1003 days.

(21) Appl. No.: 16/220,936

(22) Filed: Dec. 14, 2018

(65) Prior Publication Data

US 2020/0193303 A1  Jun. 18, 2020

(51) Int. Cl.
*G06N 5/02* (2006.01)
*G06F 16/73* (2019.01)
(Continued)

(52) U.S. Cl.
CPC .............. *G06N 5/02* (2013.01); *G06F 16/73* (2019.01); *G06F 16/9024* (2019.01); *G06V 20/49* (2022.01)

(58) Field of Classification Search
CPC ....... G06N 5/02; G06F 16/73; G06F 16/9024; G06V 20/49
See application file for complete search history.

(56) References Cited

U.S. PATENT DOCUMENTS

2008/0193016 A1   8/2008  Lim et al.
2014/0324864 A1*  10/2014  Choe .................. G06F 16/73
                                                        707/737
(Continued)

FOREIGN PATENT DOCUMENTS

CN    108198202 A    6/2018
CN    108353213 A    7/2018

OTHER PUBLICATIONS

Jean Baptiste Alayrac, et al.; "Unsupervised Learning from Narrated Instruction Videos"; retrieved from https://www.di.ens.fr/willow/research/instructionvideos/paper.pdf; from book entitled "Computer Vision and Pattern Recognition (CVPR)", published in 2016, 21 pages.

(Continued)

*Primary Examiner* — Jennifer N Welch
*Assistant Examiner* — Qi Wan
(74) *Attorney, Agent, or Firm* — Edell, Shapiro & Finnan, LLC

(57) ABSTRACT

A method, a system, and a computer program product are provided for analyzing an instructional video. Video data of an instructional video is analyzed to form multiple units of work. Each unit of work is a respective grouping of video frames of the instructional video based on a respective logical combination of activities associated therewith. Each unit of work is analyzed to produce a respective action graph of activities included in the unit of work, the respective action graph indicating interdependencies among the activities included therein. Interdependencies among activities across the units of work are determined to form a critical path graph. A received query is processed to provide troubleshooting assistance with respect to the instructional video based on the units of work, the action graphs, the critical path graph, and a knowledge base including information related to a subject matter of the instructional video.

17 Claims, 10 Drawing Sheets

(51) Int. Cl.
*G06F 16/901* (2019.01)
*G06V 20/40* (2022.01)

(56) References Cited

U.S. PATENT DOCUMENTS

| | | |
|---|---|---|
| 2015/0050006 A1 | 2/2015 | Sipe |
| 2015/0153906 A1* | 6/2015 | Liao .................... G06F 3/0481 715/709 |
| 2016/0371992 A1* | 12/2016 | Kozloski ................. G09B 5/02 |
| 2017/0017844 A1 | 1/2017 | Jeong et al. |
| 2017/0185846 A1* | 6/2017 | Hwangbo .............. G06V 10/40 |
| 2019/0102377 A1* | 4/2019 | Neuman .............. G06K 9/0057 |

OTHER PUBLICATIONS

Ozan Sener, et al., "Unsupervised Semantic Parsing of Video Collections"; Computer Vision Foundation, 2015, pp. 4480-4488.

Luowei Zhou, et al., Towards Automatic Learning of Procedures from Web Instructional Videos; Association for the Advancement of Artificial Intelligence, 2018.

Li Ding, et al., "TricorNet: A Hybrid Temporal Convolutional and Recurrent Network for Video Action Segmentation"; retrieved from https://arxiv.org/pdf/1705.07818.pdf, 2017.

Nikola Banovic, et al., "Waken: Reverse Engineering Usage Information and Interface Structure from Software Videos"; ACM 2012; pp. 83-92; retrieved from http://www.dgp.toronto.edu/~tovi/papers/2012%20UIST%20waken.pdf.

Lingfeng Bao, et al., "Reverse Engineering Time-Series Interaction Data from Screen-Captured Videos"; IEEE 2015; pp. 399-408.

\* cited by examiner

VIDEO PROCESSING FOR TROUBLESHOOTING ASSISTANCE

BACKGROUND

1. Technical Field

Present invention embodiments relate to video processing. In particular, the present invention embodiments dissect an instructional or other type of video to produce groups of discrete sets of activities, learn interdependencies among the activities and provide interactive help in response to a query from a user regarding the instructional or other video.

2. Discussion of the Related Art

Applications that perform video segmentation and indexing based on analysis of video metadata are known. These applications analyze the video metadata with respect to semantics and sequencing in order to determine events of interest and index the events of interest by their respective topic and context. This approach results in topic-context-based video segmentation.

SUMMARY

According to one embodiment of the present invention, a machine-implemented method is provided for analyzing an instructional video. Video data of the instructional video is analyzed by a processing device to form units of work. Each respective unit of work is a respective grouping of video frames of the instructional video based on a respective logical combination of activities associated therewith. The each respective unit of work is analyzed, by the processing device, to produce a respective action graph of activities included in the respective unit of work, the respective action graph indicating interdependencies among the activities. Interdependencies are determined, by the processing device, among activities across the units of work to produce a critical path graph. The processing device stores the respective action graphs for the each respective unit of work and the critical path graph. A received query is processed to provide troubleshooting assistance with respect to the instructional video based on the units of work, the respective action graphs, the critical path graph, and a knowledge base including information related to a subject matter of the instructional video.

According to another embodiment of the present invention, a system is provided for analyzing an instructional video. The system includes at least one processor and at least one memory connected to the at least one processor. The at least one processor is configured to analyze video data of the instructional video to form units of work. Each respective unit of work is a respective grouping of video frames of the instructional video based on a respective logical combination of activities associated therewith. The each respective unit of work is analyzed to produce a respective action graph of activities included in the respective unit of work, the respective action graph indicating interdependencies among the activities. The at least one processor is further configured to determine interdependencies among activities across the units of work to produce a critical path graph. The respective action graphs for the each respective unit of work and the critical path graph are stored. A received query is processed to provide troubleshooting assistance with respect to the instructional video based on the units of work, the respective action graphs, the critical path graph, and a knowledge base including information related to a subject matter of the instructional video.

According to a third embodiment of the present invention, a computer program product is provided. The computer program product includes at least one computer readable storage medium having computer readable program code embodied therewith for execution on at least one processor of a computing device to analyze an instructional video. The computer readable program code is configured to be executed by the at least one processor to perform a number of steps. The steps include the at least one processor analyzing video data of the instructional video to form units of work. Each respective unit of work is a respective grouping of video frames of the instructional video based on a respective logical combination of activities associated therewith. The at least one processor analyzes each respective unit of work to produce a respective action graph of activities included in the respective unit of work, the respective action graph indicating interdependencies among the activities. The at least one processor determines interdependencies among activities across the units of work to produce a critical path graph. The respective action graphs for the each respective unit of work and the critical path graph are stored. A received query is processed to provide troubleshooting assistance with respect to the instructional video based on the units of work, the respective action graphs, the critical path graph, and a knowledge base including information related to a subject matter of the instructional video.

BRIEF DESCRIPTION OF THE DRAWINGS

Generally, like reference numerals in the various figures are utilized to designate like components.

DETAILED DESCRIPTION

Figure 1:
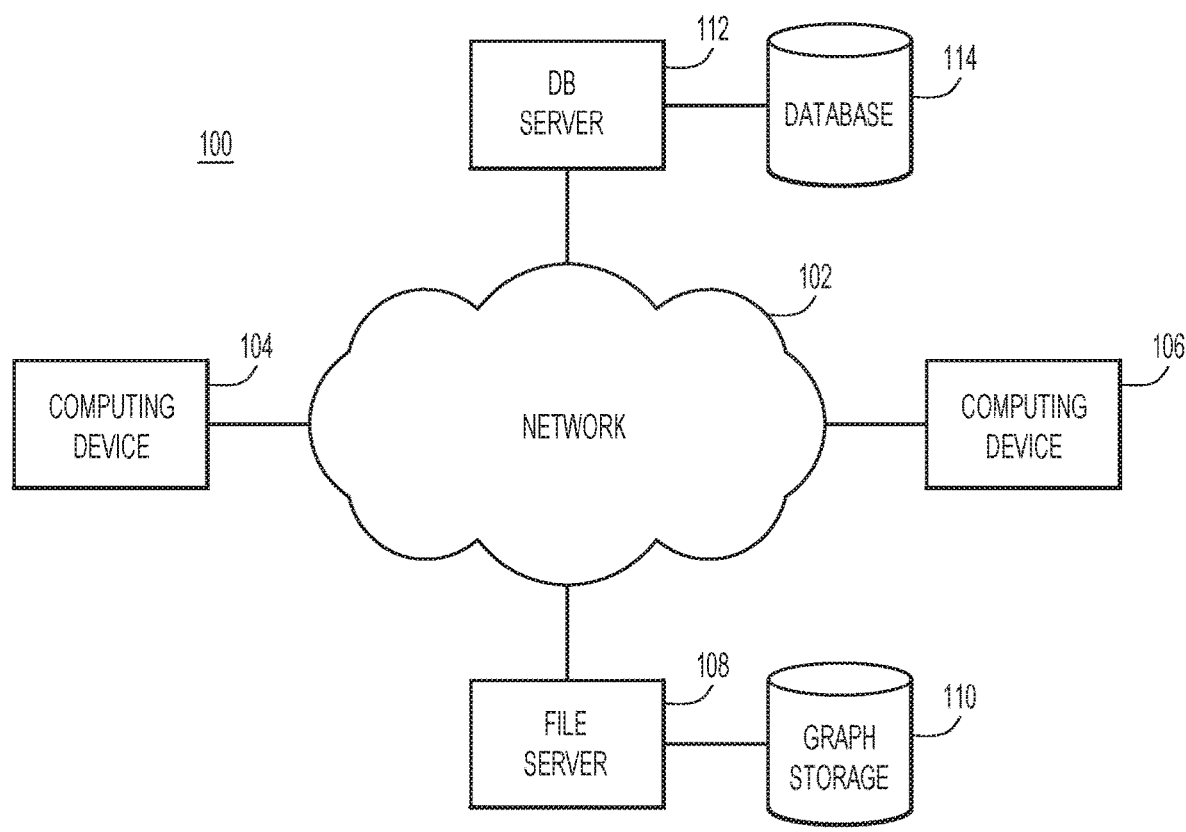
FIG. 1 shows an example operating environment according to embodiments of the invention.

Applications that perform video segmentation and indexing based on analysis of video metadata are unable to provide interactive help to a user who has viewed an instructional video, but needs assistance regarding one or more aspects of the instructional video. For example, these applications are incapable of helping a struggling user who, with respect to an instructional video, misses a step, misinterprets a step, or has difficulty understanding a step due to the instructional video not being well articulated or demonstrated.

Embodiments of the invention extract video frames from video data of an instructional or other video and produce frame level semantics by analyzing object movements within the extracted video frames, audio data and/or text captioning included in the video frames, and differences among the video frames. Based on the frame level semantics, groups of the extracted video frames may form respective video shots. The respective video shots may be grouped to form respective groups of video shots based on the frame level semantics and video shot boundary detection. Video shot summarization may be performed based on the frame level semantics associated with the video frames included in the video shots.

Activities may be associated with the video shots included in the groups of video shots. Associating the activities may include conversion of speech included in audio portions of the video frames included in the video shots and optical character recognition of captions or subtitles included in the video shots. A knowledge base, which may be stored in a database, may include domain-based semantics regarding a subject matter of the instructional video.

Units of work may be formed, or generated, based on the groups of video shots associated with activities. The generating of the units of work may include correlation of temporally distant video shots, sequencing of video shots within groups of video shots, and use of domain-based knowledge included in the knowledge base. As an example of correlation of temporally distant video shots in an instructional video, the instructional video may show an instructor painting a door of a house and letting the paint dry. The video may then show the instructor welding a window. After some period of time, the instructor checks the paint on the door and determines that more time is needed for the paint to dry. As a result, the instructor continues with the welding of the window. After a few more minutes, the instructor indicates that the paint on the door is dry. As a result, there are two units of work, one of which is painting the door. The temporally distant shots of the door painting may be correlated with the earlier shots of the door painting for purposes of creating an action graph.

A respective action graph may be produced for each unit of work to indicate activities included in the unit of work and interdependencies among the activities within the unit of work. Interdependencies of activities across units of work may be determined and a representation of a critical path graph may be produced to show the interdependencies. A knowledge base including information related to a subject matter of the instructional video may be used to produce respective action graphs and the critical path graph.

The units of work, the action graphs, the critical path graph, and the knowledge base may be accessible for use in providing interactive assistance to a user viewing the instructional video.

An example environment for use with present invention embodiments is illustrated in FIG. 1. Specifically, the environment may include one or more computing devices 104, 106, and a file server 108 and a database server 112 connected to a network 102 either via a wired or a wireless connection. File server 108 may be connected to graph storage 110 for storing one or more representations of a graph. Database server 112 may be connected to a database 114. Computing devices 104, 106, may be remotely located from file server 108 and database server 112 and may communicate via network 102. Network 102 may be implemented by any number of any suitable communications media (e.g., wide area network (WAN), local area network (LAN), Internet, Intranet, etc.). Alternatively, computing devices 104, 106, fileserver 108 and database server 112 may be local to each other, and may communicate via any appropriate local communication medium (e.g., local area network (LAN), hardwire, wireless link, Intranet, etc.). In a standalone embodiment, a computing device such as, for example, computing device 104 or computing device 106, may have access to graph storage 110 and database 114 directly.

Figure 2:
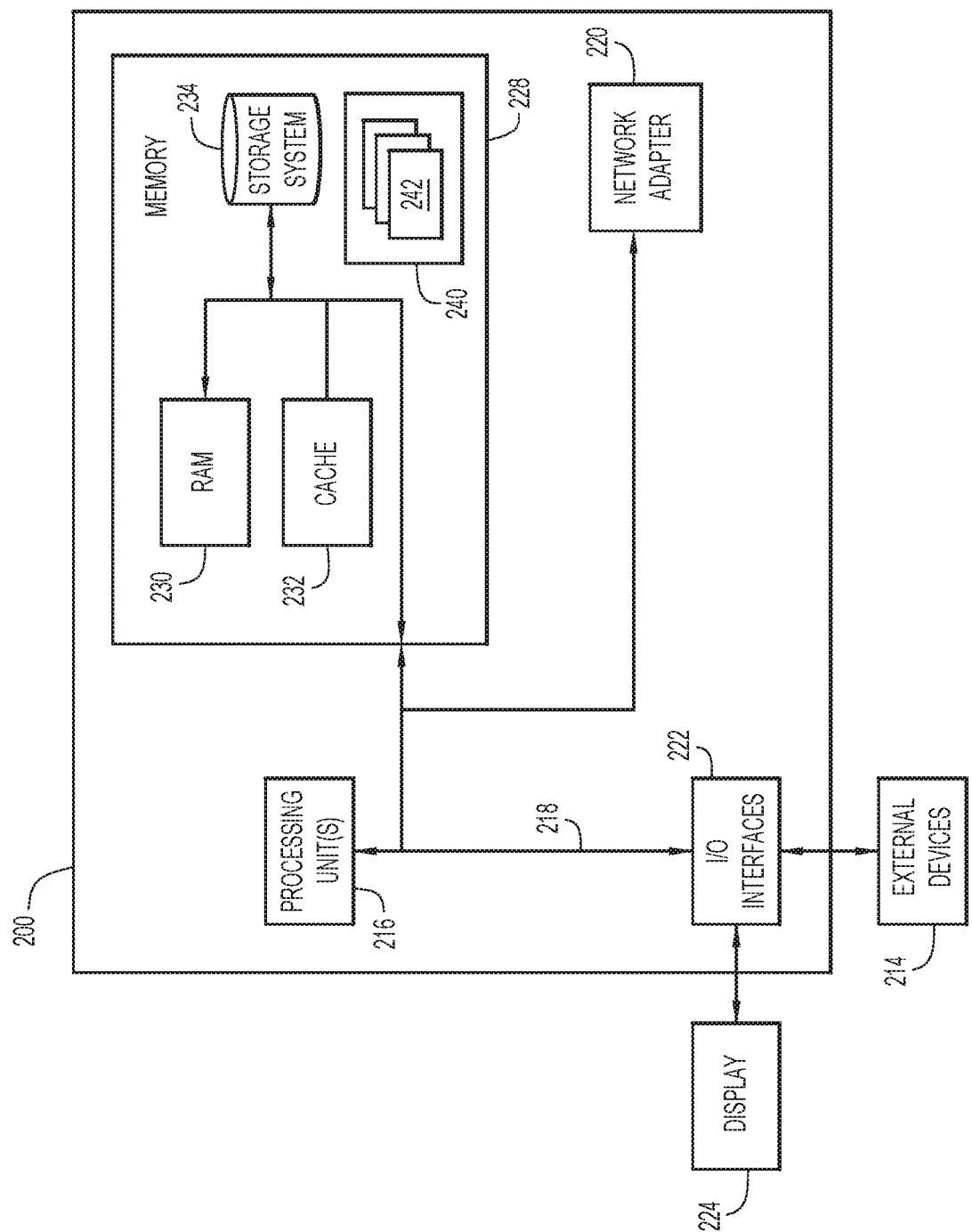
FIG. 2 is a functional block diagram of a general purpose computer for implementing embodiments of the invention.

Referring now to FIG. 2, a schematic of an example computer system 200 is shown, which may implement computing device 104, 106, file server 108, or database server 112 in various embodiments. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
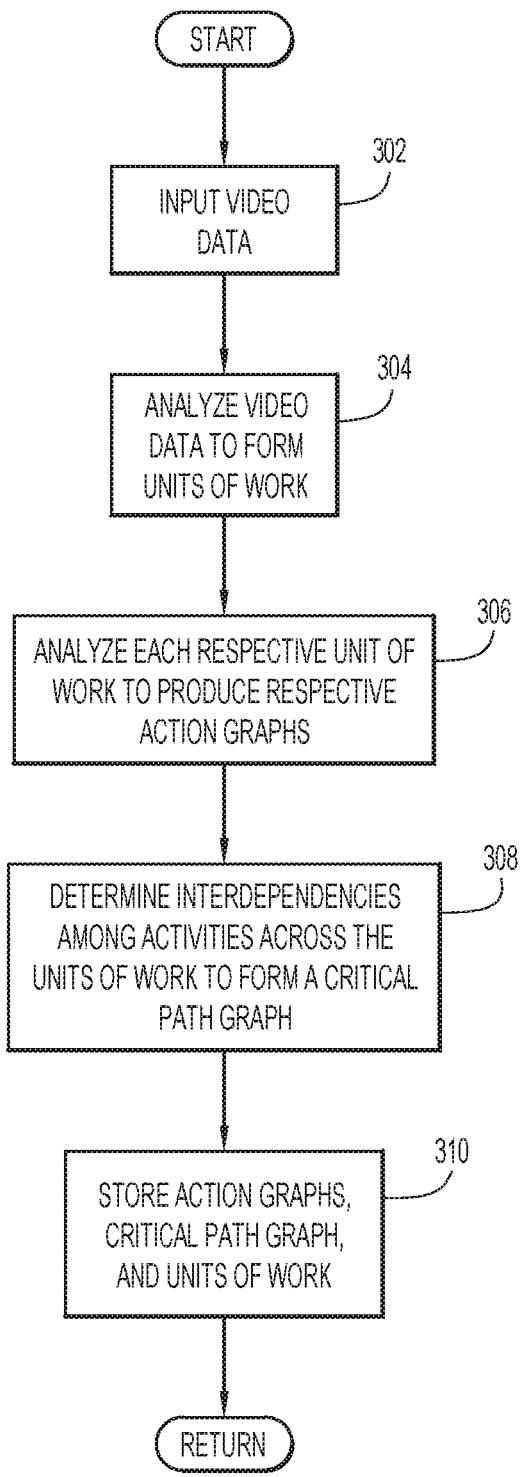
FIG. 3 is a flowchart illustrating example processing that may be performed according to embodiments of the invention.

FIG. 3 is a flowchart that illustrates an example process that may be performed in a computing device such as, for example, computing device 104 or computing device 106 according to embodiments of the invention. The process may begin by inputting video data of an instructional video (act 302). The computing device may then analyze the video data to form units of work, each of which includes a group of respective activities (act 304). Each respective unit of work may then be analyzed to produce a respective action graph, which indicates any interdependencies among activities included in the respective unit of work (act 306). The computing device may then determine interdependencies among activities across the units of work to form a critical path graph, which indicates the interdependencies among these activities (act 308). The computing device may then store the respective action graphs of the units of work and the critical path graph in graph storage 110 and may store the units of work in database 114 or other storage (act 310). The process may then be completed. Graph storage 110 may be directly connected to the computing device or may be accessible to the computing device via network 102 and file server 108.

Figure 4:
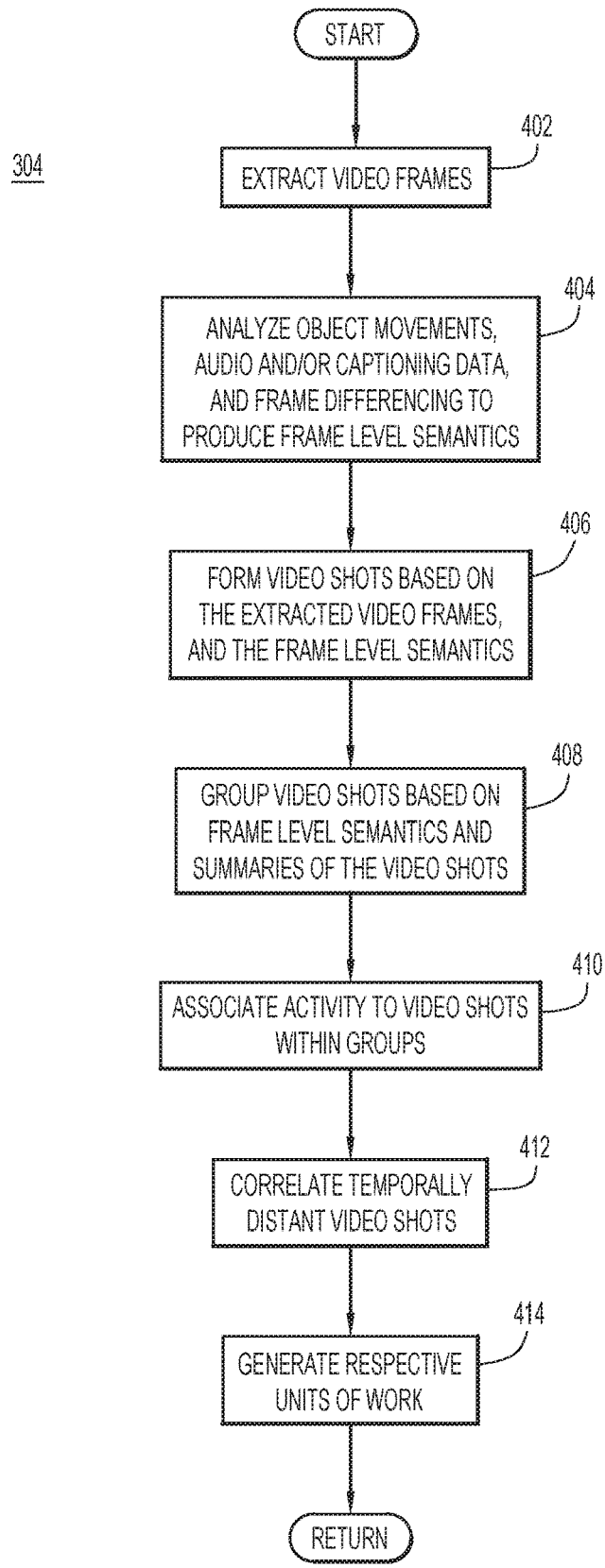
FIG. 4 is a flowchart of an example process for analyzing video data to form units of work according to embodiments of the invention.

FIG. 4 is a flowchart illustrating example processing of act 304 of FIG. 3 for analyzing the video data to form the units of work according to embodiments of the invention. The process may begin by extracting video frames from the input video data of the instructional video (act 402). Each of the video frames may then be analyzed to determine movement of objects from one video frame to another, obtain information from captions or subtitles that may be included in the video frames via use of optical character recognition and/or audio included in the video frames by converting speech to text, and determining differences among the video frames to produce frame level semantics (act 404).

Next, the computing device may form video shots based on groups of the extracted video frames, video shot boundary detection, and the frame level semantics, and may produce summaries of the video shots (act 406). The video shot boundary detection determines an end of a video shot. For example, if a video shot includes a car, video shot boundary detection may determine an end of the video shot when the car disappears from the video frames. The computing device may form groups of video shots based on the frame level semantics and the summaries of the video shots (act 408).

The computing device may then associate activities to groups of video shots (act 410). The associating may include converting speech of an audio portion of the groups of video shots to text and performing optical character recognition of any captions or subtitles included in the video frames of the groups of video shots. Further, the computing device may correlate groups of video shots to temporally distant video shots (act 412).

The computing device may then generate respective units of work based on the activities associated with the respective groups of video shots (act 414). During the generating of the respective units of work, sequencing of video shots within the groups may be analyzed. Further, external information such as, for example, domain-based knowledge, may be used to resolve any ambiguities. In some embodiments, the domain-based knowledge may be included in a knowledge base that includes information related to a subject matter of the instructional video. The knowledge base may be included in database 114, which may be accessible either directly by the computing device or indirectly via network 102 and database server 112.

Figure 5:
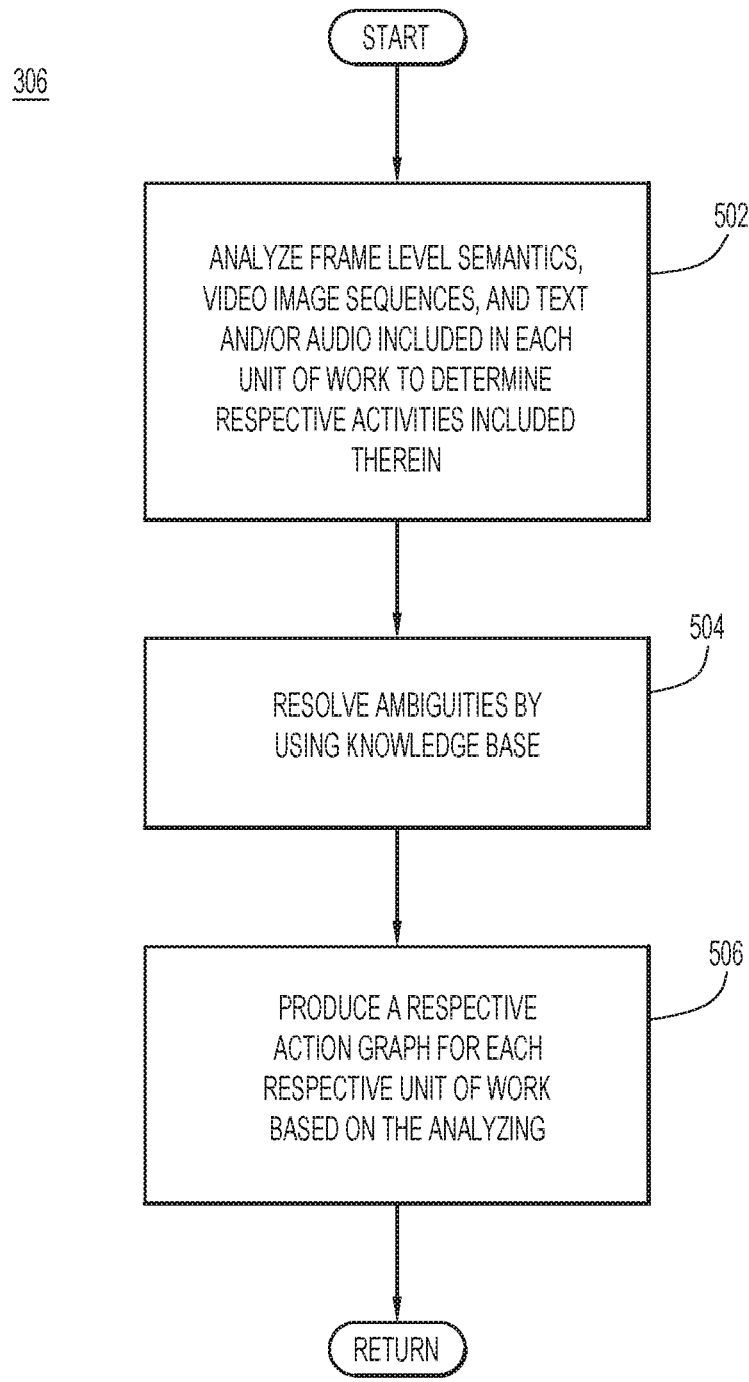
FIG. 5 is a flowchart of an example process for analyzing each respective unit of work to produce respective action graphs according to embodiments of the invention.

FIG. 5 is a flowchart of an example process for performing act 306 of FIG. 3 to produce respective action graphs for each respective unit of work. Respective activities included in each of the units of work may be determined by analyzing the frame level semantics, video image sequences, and text and/or audio included in the respective video frames of the each unit of work (act 502). The computing device may resolve any ambiguities by using domain-based knowledge, which may be included in the knowledge base (act 504). The computing device may then produce a respective action graph for each respective unit of work based on the analyzing (act 506). The respective action graphs may indicate interdependencies among the activities included therein. The process may then be completed.

Figure 6:
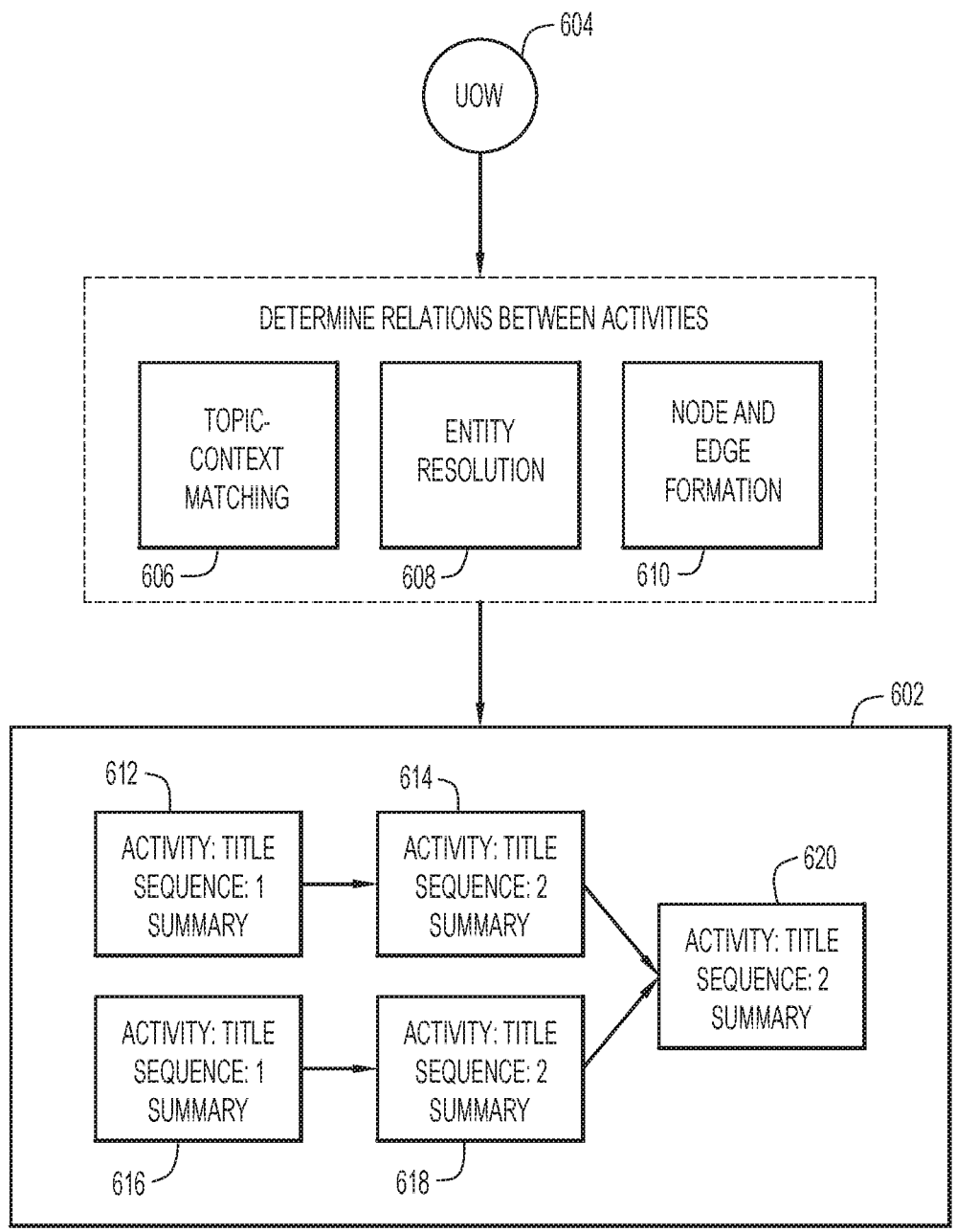
FIG. 6 shows an example action graph and explains processing for producing an action graph according to embodiments of the invention.

FIG. 6 shows an example action graph and further explains production of an action graph from a unit of work. Relations between activities of unit of work 604 may be determined based on performing topic-context matching 606 of activity summary descriptions. Entity resolution 608 may be performed to resolve ambiguities regarding an entity by accessing an external domain-based knowledge source such as, for example, a knowledge base including information related to a subject matter of the instructional video. Node and edge formation 610 may be performed to provide a representation of an action graph, which shows interdependencies among the activities of the action graph.

According to action graph 602, activity 612 is completed before activity 604 can be started. Similarly, activity 616 is completed before activity 618 can be started. Activities 614, 618 are completed before activity 620 can be started. In action graph 602, each activity has a sequence number associated therewith indicating an order in which the activities are performed in video frames of the unit of work.

Figure 7:
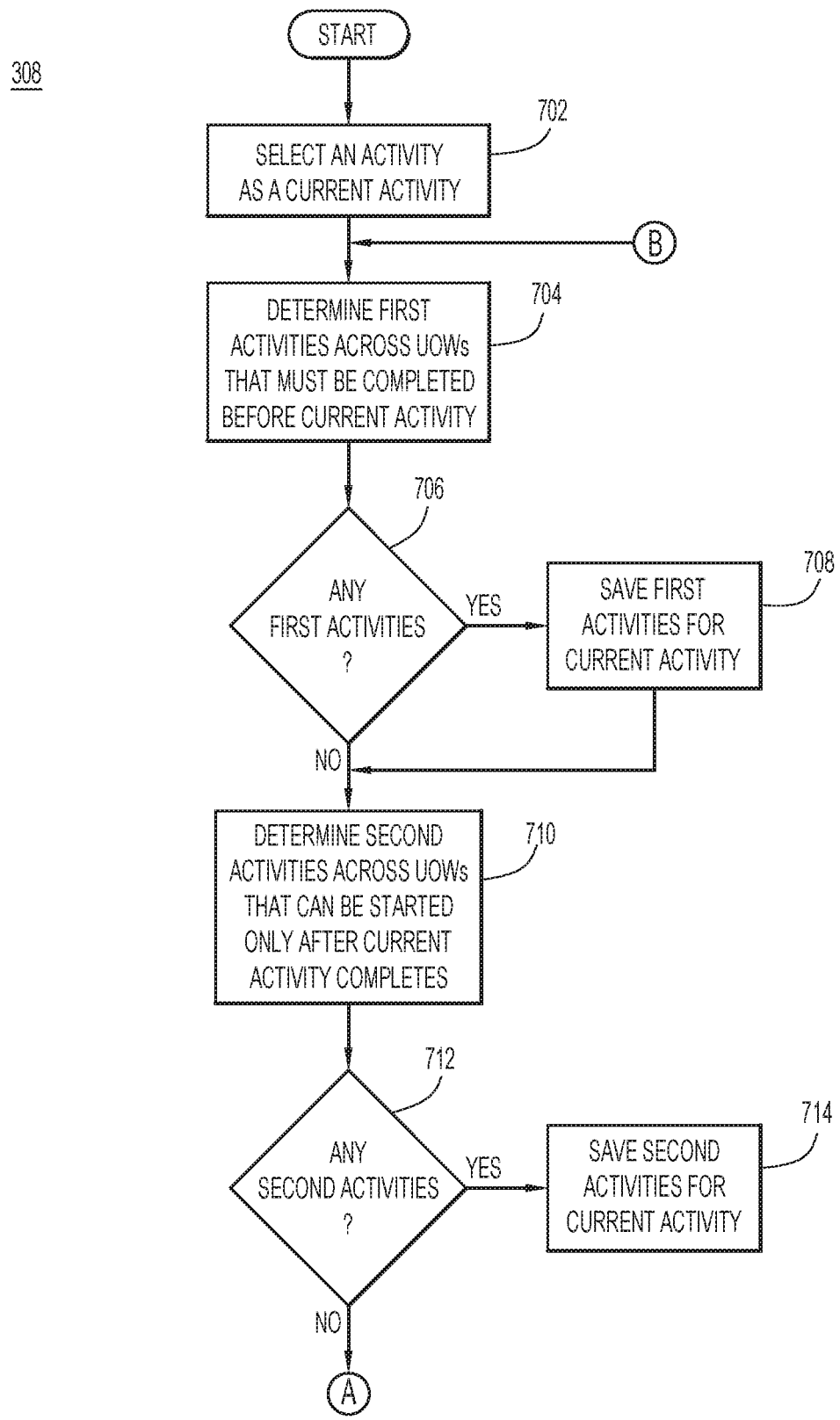
FIGS. 7 and 8 illustrate a flowchart of an example process for determining interdependencies among activities across units of work to form a critical path graph according to embodiments of the invention.
Figure 8:
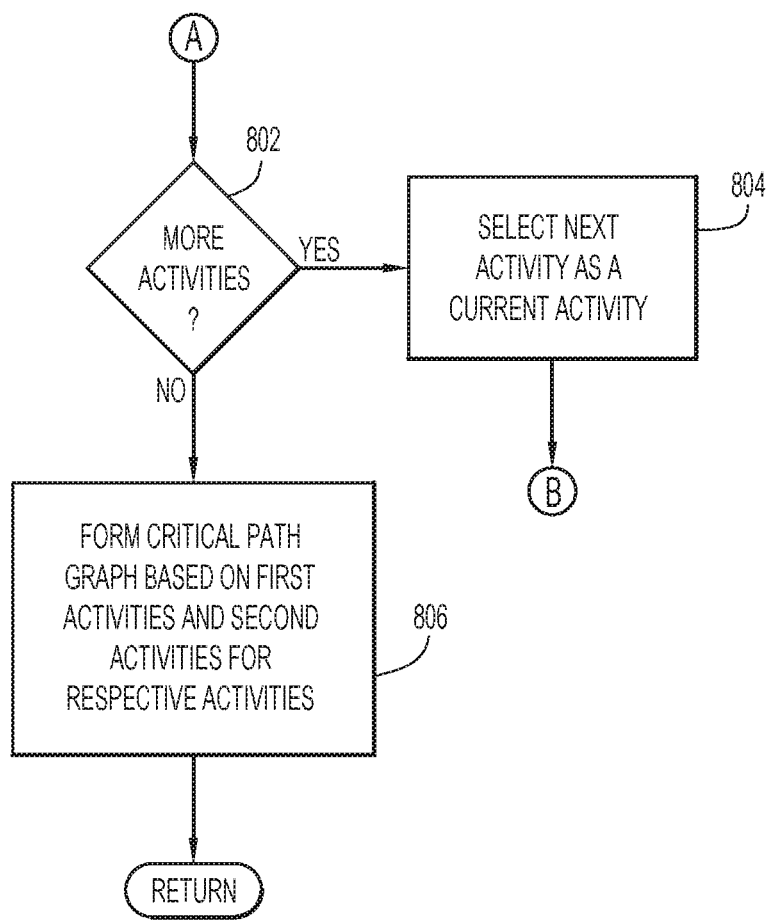

FIGS. 7-8 include a flowchart of an example process for performing act 308 of FIG. 3 to determine interdependencies among activities across units of work in order to form a critical path graph. The process may begin with the computing device selecting an activity as a current activity (act 702). The computing device may then determine first activities across the units of work that must be completed before the current activity (act 704). Next, a determination may be made regarding whether there are any first activities with respect to the current activity (act 706). If so, then the first activities with respect to the current activity may be saved (act 708). The computing device may then determine second activities across the units of work that can be started only after the current activity completes (act 710). A determination may then be made regarding whether there are any second activities with respect to the current activity (act 712). If so, the second activities with respect to the current activity may be saved (act 714).

Next, the computing device may determine whether there are any more activities to process across the units of work (act 802). If so, then a next activity may be selected as a current activity (act 804) and acts 704-714 and 802 may again be performed. Otherwise, the computing device may form the critical path graph based on the determined first activities and the determined second activities for the respective activities (act 806).

Figure 9:
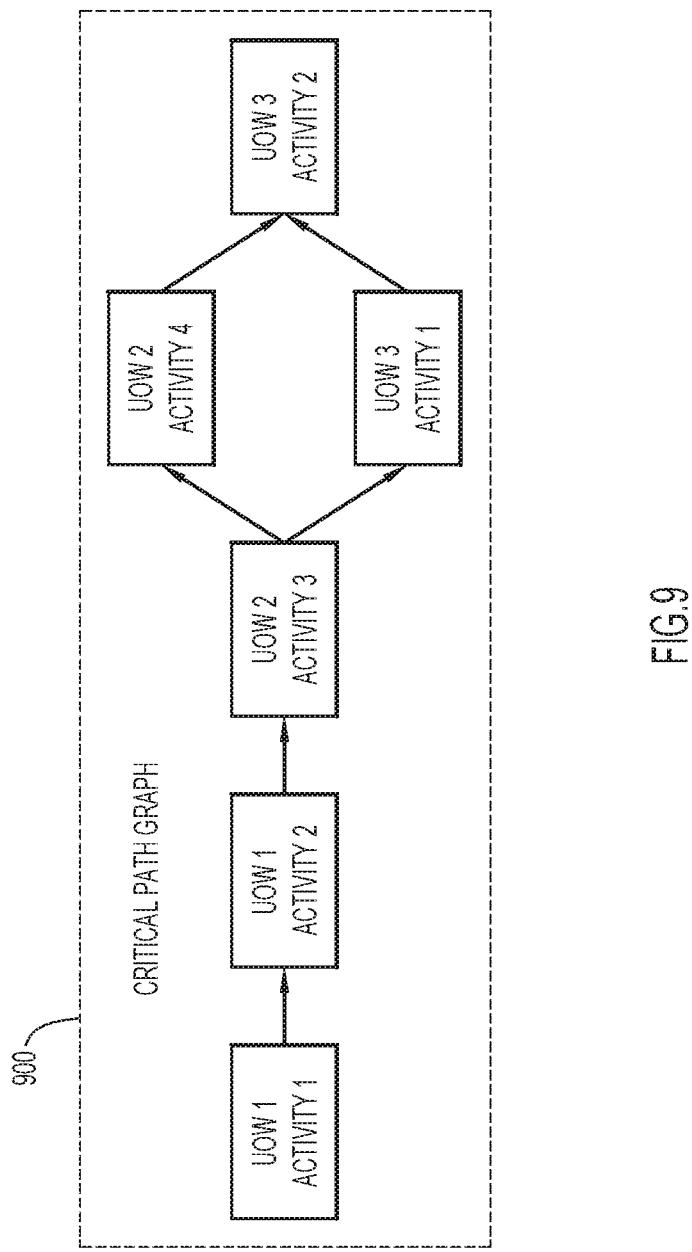
FIG. 9 shows an example critical path graph according to embodiments of the invention.

FIG. 9 illustrates an example critical path graph 900 of activities across units of work. As shown in critical path graph 900, activity 4 of unit of work 2 and activity 1 of unit of work 3 must be completed before activity 2 of unit of work 3 can be performed. Activity 3 of unit of work 2 must be completed before performing activity 4 of unit of work 2 and activity 1 of unit of work 3. Activity 2 of unit of work 1 must be completed before performing activity 3 of unit of work 2. Finally, activity 1 of unit of work 1 must be completed before performing activity 2 of unit of work 1.

Figure 10:
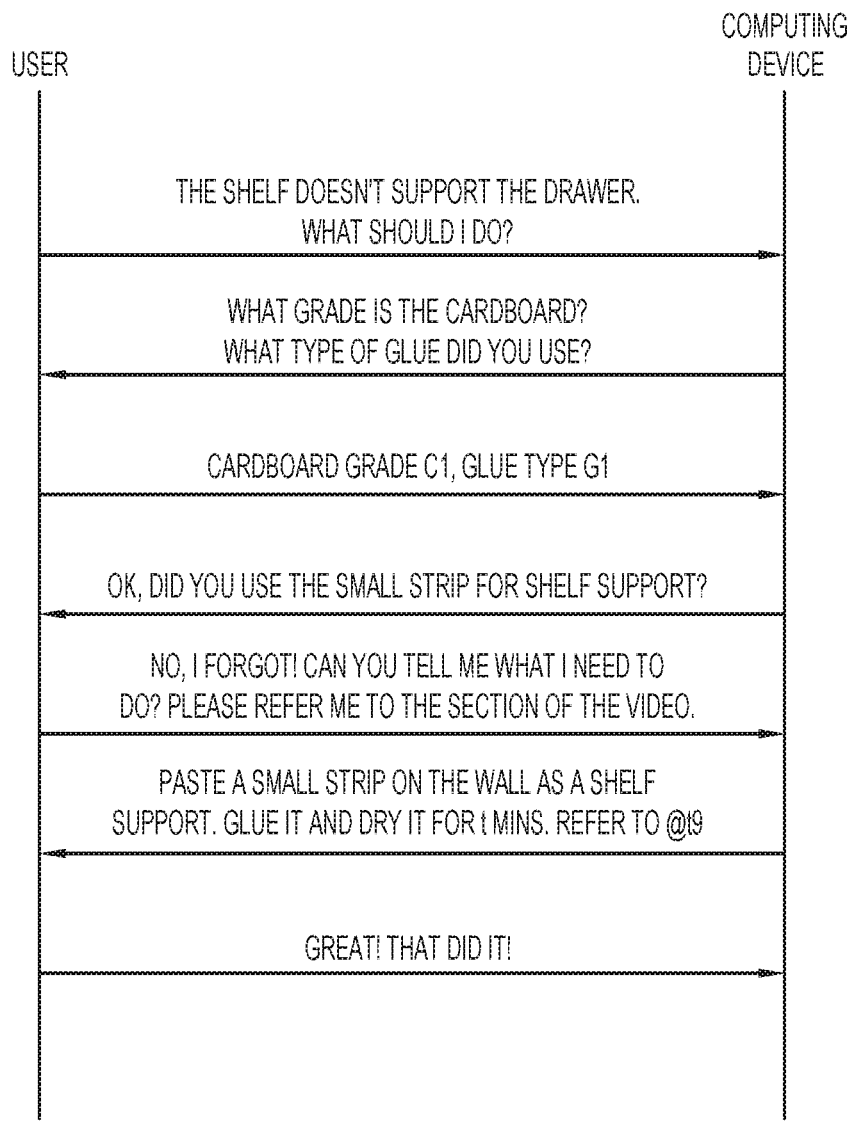
FIG. 10 illustrates example interactions, according to embodiments of the invention, for providing troubleshooting assistance with respect to an instructional video.

FIG. 10 illustrates example interactions between a user, who viewed an instructional video for building a pencil house for storing pencils, and a computing device that has access to action graphs, critical path graphs, and units of work previously built from analyzing the instructional video. In one embodiment, a computing device such as, for example, computing device 104 (FIG. 1) may analyze the instructional video as previously described and may store action graphs and a critical path graph in graph storage 110 and units of work in database 114. Computing device 106, on which a user may view the instructional video, may have access to the units of work in database 114 and the action graphs and the critical path graph in graph storage 110. In another embodiment, the units of work, the action graphs, and the critical path graph may be stored on at least one computer readable storage medium. The instructional video also may be stored on the at least one computer readable storage medium.

Starting from a top of FIG. 10, the user may provide a query to computing device 106 such as, for example, "The shelf doesn't support the drawer. What should I do?" Computing device 106, which has access to the units of work, the action graphs, the critical path graph and external domain-based knowledge, which may be stored in a knowledge base, may determine that more information is needed and may respond to the user with "What grade is the cardboard? What type of glue did you use?" The user may respond with "Cardboard grade C1, glue type G1." Computing device 106 may respond with "Okay, did you use a small strip for shelf support?" The user may respond with "No, I forgot! Can you tell me what I need to do? Please refer me to the section of the video." Computing device 106 may then respond with "Paste a small strip on the wall as a shelf support. Glue it and dry it for t mins. Refer to @t9." After successfully following the computing devices instructions, the user may respond with "Great! That did it!"

It will be appreciated that the embodiments described above and illustrated in the drawings represent only a few of the many ways of implementing embodiments for analyzing an instructional video in order to provide troubleshooting assistance to a user who viewed the instructional video.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., knowledge base, units of work, action graphs, critical path graphs, etc.). The database system may be implemented by any number of any conventional or other databases, data stores or storage structures to store information. The database system may be included within or coupled to a server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A machine-implemented method for analyzing an instructional video comprising:
analyzing, by a processing device, video data of the instructional video to form a plurality of units of work, the analyzing of the video data to form the plurality of units of work further comprising:
extracting video frames from the video data;
producing frame level semantics for the extracted video frames based at least on movement of at least one object in at least some of the extracted video frames and frame differencing among the extracted video frames;
forming a plurality of video shots based on the extracted video frames and the frame level semantics, each respective video shot being based on a respective plurality of the extracted video frames;
grouping respective pluralities of the video shots to form respective groups of video shots based on the frame level semantics and a respective summary of the each respective video shot;
associating a respective activity to each of the respective groups of video shots; and
generating the each respective unit of work by associating domain-based semantics included in a knowledge base to respective activities within the each of the respective groups of video shots;
wherein the instructional video shows different steps for a user to perform, wherein each respective unit of work being a respective grouping of video frames of the instructional video based on a respective logical combination of activities associated therewith, and wherein each respective unit of work includes work information including the frame level semantics, video image sequences, and text and audio of the grouping of video frames;
analyzing, by the processing device, the each respective unit of work to produce a respective action graph of a plurality of activities included in the respective unit of work, the respective action graph indicating interdependencies among the plurality of activities and including activity information for each activity including an activity title, a sequence number indicating an order of performance, and a summary description of the activity obtained from the text and audio of the grouping of video frames for the respective unit of work;
determining, by the processing device, interdependencies among activities across the plurality of units of work to produce a critical path graph, wherein the critical path graph indicates an order of performance of the activities across the plurality of units of work and includes path information for the activities indicating a corresponding unit of work and a corresponding activity;
storing, by the processing device, the respective action graphs for the each respective unit of work and the critical path graph;
presenting, by the processing device, the instructional video to the user; and
processing a natural language query from the user viewing the instructional video pertaining to a step of the instructional video to provide information satisfying the query with respect to the step of the instructional video based on the plurality of units of work, the respective action graphs, the critical path graph, and the knowledge base including information related to a subject matter of the instructional video, wherein processing the natural language query comprises:
applying terms of the natural language query to the work information of the plurality of units of work, the activity information of the action graphs, and the path information of the critical path graph to identify the activity associated with the step of the natural language query;
determining the information for the step pertaining to the natural language query and a corresponding section of the instructional video containing the information for the step from the work information and the activity information for the identified activity; and providing the information for the step and the corresponding section of the instructional video to the user.

2. The machine-implemented method of claim 1, wherein the forming of the plurality of video shots comprises:

performing video shot summarization to produce the respective summary of the each respective video shot.

3. The machine-implemented method of claim 2, wherein the forming of the plurality of video shots further comprises:

performing video shot boundary detection to detect an end of the each respective video shot.

4. The machine-implemented method of claim 3, wherein the analyzing of the each respective unit of work to produce the respective action graph of the plurality of activities included in the each respective unit of work further comprises:

analyzing the frame level semantics, video image sequences and the text and audio included in the each respective unit of work to determine a respective plurality of activities included in the each respective unit of work, using the knowledge base to resolve any entity ambiguities in the each respective unit of work, and producing the respective action graph for the each respective unit of work based on the analyzing of the frame level semantics, video image sequences and the text and audio included in the each respective unit of work and the resolved any entity ambiguities.

5. The machine-implemented method of claim 4, wherein the generating of the each respective unit of work further comprises:

correlating temporally distant video shots of the plurality of video shots.

6. The machine-implemented method of claim 1, wherein the determining the interdependencies among the activities across the plurality of units of work to produce the critical path graph further comprises:

for each respective activity of the plurality of units of work, performing:

determining first activities across the plurality of units of work that must be completed before starting the respective activity, and determining second activities across the plurality of units of work that can be started only after completion of the respective activity; and forming the critical path graph based on the determined first activities and the determined second activities with respect to each of the respective activities.

7. A system for analyzing an instructional video comprising:

at least one processor;

at least one memory connected to the at least one processor, wherein the at least one processor is configured to perform:

analyzing video data of the instructional video to form a plurality of units of work, the analyzing of the video data to form the plurality of units of work further comprising:

extracting video frames from the video data;

producing frame level semantics for the extracted video frames based at least on movement of at least one object in at least some of the extracted video frames and frame differencing among the extracted video frames;

forming a plurality of video shots based on the extracted video frames and the frame level semantics, each respective video shot being based on a respective plurality of the extracted video frames;

grouping respective pluralities of the video shots to form respective groups of video shots based on the frame level semantics and a respective summary of the each respective video shot;

associating a respective activity to each of the respective groups of video shots; and generating the each respective unit of work by associating domain-based semantics included in a knowledge base to respective activities within the each of the respective groups of video shots;

wherein the instructional video shows different steps for a user to perform, wherein each respective unit of work being a respective grouping of video frames of the instructional video based on a respective logical combination of activities associated therewith, and wherein each respective unit of work includes work information including the frame level semantics, video image sequences, and text and audio of the grouping of video frames;

analyzing the each respective unit of work to produce a respective action graph of a plurality of activities included in the respective unit of work, the respective action graph indicating interdependencies among the plurality of activities and including activity information for each activity including an activity title, a sequence number indicating an order of performance, and a summary description of the activity obtained from the text and audio of the grouping of video frames for the respective unit of work;

determining interdependencies among activities across the plurality of units of work to produce a critical path graph, wherein the critical path graph indicates an order of performance of the activities across the plurality of units of work and includes path information for the activities indicating a corresponding unit of work and a corresponding activity;

storing the respective action graphs for the each respective unit of work and the critical path graph;

presenting the instructional video to the user; and processing a natural language query from the user viewing the instructional video pertaining to a step of the instructional video to provide information satisfying the query with respect to the step of the instructional video based on the plurality of units of work, the respective action graphs, the critical path graph, and the knowledge base including information related to a subject matter of the instructional video, wherein processing the natural language query comprises:

applying terms of the natural language query to the work information of the plurality of units of work, the activity information of the action graphs, and the path information of the critical path graph to identify the activity associated with the step of the natural language query;

determining the information for the step pertaining to the natural language query and a corresponding section of the instructional video containing the information for the step from the work information and the activity information for the identified activity; and providing the information for the step and the corresponding section of the instructional video to the user.

8. The system of claim 7, wherein the forming of the plurality of video shots comprises:
performing video shot summarization to produce the respective summary of the each respective video shot.

9. The system of claim 8, wherein the forming of the plurality of video shots further comprises:
performing video shot boundary detection to detect an end of the each respective video shot.

10. The system of claim 9, wherein the analyzing of the each respective unit of work to produce the respective action graph of the plurality of activities included in the respective unit of work further comprises:
analyzing the frame level semantics, video image sequences and the text and audio included in the each respective unit of work to determine a respective plurality of activities included in the each respective unit of work,
using the knowledge base to resolve any entity ambiguities in the each respective unit of work, and
producing the respective action graph for the each respective unit of work based on the analyzing of the frame level semantics, video image sequences and the text and audio included in the each respective unit of work and the resolved any entity ambiguities.

11. The system of claim 10, wherein the generating of the each respective unit of work further comprises:
correlating temporally distant video shots of the plurality of video shots.

12. The system of claim 7, wherein the determining the interdependencies among the activities across the plurality of units of work to produce the critical path graph further comprises:
for each respective activity of the plurality of units of work, performing:
determining first activities across the plurality of units of work that must be completed before starting the respective activity, and
determining second activities across the plurality of units of work that can be started only after completion of the respective activity; and
forming the critical path graph based on the determined first activities and the determined second activities with respect to each of the respective activities.

13. A computer readable storage medium having computer readable program code embodied therewith for execution on at least one processor of a computing device to analyze an instructional video, the computer readable program code being configured to be executed by the at least one processor to perform:
analyzing video data of the instructional video to form a plurality of units of work, the analyzing of the video data to form the plurality of units of work further comprising:
extracting video frames from the video data;
producing frame level semantics for the extracted video frames based at least on movement of at least one object in at least some of the extracted video frames and frame differencing among the extracted video frames;
forming a plurality of video shots based on the extracted video frames and the frame level semantics, each respective video shot being based on a respective plurality of the extracted video frames;
grouping respective pluralities of the video shots to form respective groups of video shots based on the frame level semantics and a respective summary of the each respective video shot;
associating a respective activity to each of the respective groups of video shots; and
generating the each respective unit of work by associating domain-based semantics included in a knowledge base to respective activities within the each of the respective groups of video shots;
wherein the instructional video shows different steps for a user to perform, wherein each respective unit of work being a respective grouping of video frames of the instructional video based on a respective logical combination of activities associated therewith, and wherein each respective unit of work includes work information including the frame level semantics, video image sequences, and text and audio of the grouping of video frames;
analyzing the each respective unit of work to produce a respective action graph of a plurality of activities included in the respective unit of work indicating interdependencies among the plurality of activities and including activity information for each activity including an activity title, a sequence number indicating an order of performance, and a summary description of the activity obtained from the text and audio of the grouping of video frames for the respective unit of work;
determining interdependencies among activities across the plurality of units of work to produce a critical path graph, wherein the critical path graph indicates an order of performance of the activities across the plurality of units of work and includes path information for the activities indicating a corresponding unit of work and a corresponding activity;
storing the respective action graphs for the each respective unit of work and the critical path graph;
presenting the instructional video to the user; and
processing a natural language query from the user viewing the instructional video pertaining to a step of the instructional video to provide information satisfying the query with respect to the step of the instructional video based on the plurality of units of work, the respective action graphs, the critical path graph, and the knowledge base including information related to a subject matter of the instructional video, wherein processing the natural language query comprises:
applying terms of the natural language query to the work information of the plurality of units of work, the activity information of the action graphs, and the path information of the critical path graph to identify the activity associated with the step of the natural language query;
determining the information for the step pertaining to the natural language query and a corresponding section of the instructional video containing the information for the step from the work information and the activity information for the identified activity; and
providing the information for the step and the corresponding section of the instructional video to the user.

14. The computer readable storage medium of claim 13, wherein the forming of the plurality of shots comprises:
performing video shot summarization to produce the respective summary of the each respective video shot, and performing video shot boundary detection to detect an end of the each respective video shot.

15. The computer readable storage medium of claim 14, wherein the analyzing of the each respective unit of work to produce the respective action graph of the plurality of activities included in the respective unit of work further comprises:
- analyzing the frame level semantics, video image sequences and the text and audio included in the each respective unit of work to determine a respective plurality of activities included in the each respective unit of work,
- using the knowledge base to resolve any entity ambiguities in the each respective unit of work, and
- producing the respective action graph for the each respective unit of work based on the analyzing of the frame level semantics, video image sequences and the text and audio included in the each respective unit of work and the resolved any entity ambiguities.

16. The computer readable storage medium of claim 15, wherein the generating of the each respective unit of work further comprises:
- correlating temporally distant video shots of the plurality of video shots.

17. The computer readable storage medium of claim 13, wherein the determining the interdependencies among the activities across the plurality of units of work to produce the critical path graph further comprises:
- for each respective activity of the plurality of units of work, performing:
  - determining first activities across the plurality of units of work that must be completed before starting the respective activity, and
  - determining second activities across the plurality of units of work that can be started only after completion of the respective activity; and
- forming the critical path graph based on the determined first activities and the determined second activities with respect to each of the respective activities.

\* \* \* \* \*